(12) United States Patent
Ramler et al.

(10) Patent No.: US 10,753,503 B2
(45) Date of Patent: Aug. 25, 2020

(54) SOLENOID VALVE FOR A FUEL SYSTEM

(71) Applicant: Andreas Stihl AG & Co. KG, Waiblingen (DE)

(72) Inventors: Jens Ramler, Waiblingen (DE); Felix Mayer, Waiblingen (DE); Hiroyuki Oka, Iwateken (JP); Hideki Watanabe, Iwateken (JP)

(73) Assignee: Andreas Stihl AG & Co. KG, Waiblingen (DE)

( * ) Notice: Subject to any disclaimer, the term of this patent is extended or adjusted under 35 U.S.C. 154(b) by 233 days.

(21) Appl. No.: 15/178,916

(22) Filed: Jun. 10, 2016

(65) Prior Publication Data
US 2016/0369914 A1 Dec. 22, 2016

(30) Foreign Application Priority Data
Jun. 17, 2015 (DE) .......................... 10 2015 007 694

(51) Int. Cl.
*F16K 31/06* (2006.01)
*F16K 27/02* (2006.01)
(Continued)

(52) U.S. Cl.
CPC ......... *F16K 31/0655* (2013.01); *F02M 51/02* (2013.01); *F02M 51/08* (2019.02); *F16K 1/12* (2013.01); *F16K 27/029* (2013.01); *F02M 21/0272* (2013.01); *F02M 2200/8046* (2013.01); *F02M 2200/8053* (2013.01); *F02M 2200/8061* (2013.01); *F02M 2200/856* (2013.01)

(58) Field of Classification Search
CPC .... F16K 1/34; F16K 31/0655; F16K 27/0281; F16K 27/029; F02M 21/026; F02M 21/0272
USPC ........................................ 251/129.15, 129.16
See application file for complete search history.

(56) References Cited

U.S. PATENT DOCUMENTS 2,925,826 A * 2/1960 Streeter ................ G05D 7/0106
137/517
3,572,631 A * 3/1971 Ritchart .................. F16K 27/02
137/454.6
(Continued)

FOREIGN PATENT DOCUMENTS

| CN | 1723345 | 1/2006 |
|---|---|---|
| DE | 198 51 143 | 5/2000 |

(Continued)

*Primary Examiner* — Seth W. Mackay-Smith
(74) *Attorney, Agent, or Firm* — Gudrun E. Huckett

(57) ABSTRACT

A solenoid valve for a fuel system has an electric coil and an armature disposed in a housing. A preassembled valve unit with valve seat, valve member, valve spring, and armature plate connected captively to each other is provided. In the valve unit, the valve seat is loosely secured between valve member and armature plate. The valve unit is inserted and secured in an open housing end and the valve spring contacts an inner shoulder of the housing. Armature plate and armature form a magnetic circuit. The valve member is supported on the armature plate and switched to open and close an outlet of the valve seat. By suppling current, a magnetic field is generated in the armature and attracts the armature plate into an operative valve position. The valve spring returns the armature plate into a rest position when the coil is currentless.

16 Claims, 4 Drawing Sheets

(51) Int. Cl.
*F02M 51/02* (2006.01)
*F02M 51/08* (2006.01)
*F16K 1/12* (2006.01)
*F02M 21/02* (2006.01)

(56) References Cited

U.S. PATENT DOCUMENTS

| | | | | |
|---|---|---|---|---|
| 3,608,585 | A * | 9/1971 | Huntington | F16K 31/0606 137/625.65 |
| 4,522,371 | A * | 6/1985 | Fox | F16K 31/0651 137/627.5 |
| 4,535,816 | A * | 8/1985 | Feder | F16H 61/0251 137/625.65 |
| 4,573,659 | A * | 3/1986 | Homes | F02M 59/466 239/459 |
| 4,579,145 | A * | 4/1986 | Leiber | F16H 61/0251 137/312 |
| 4,678,160 | A * | 7/1987 | Yamada | F02M 59/466 137/554 |
| 4,835,503 | A * | 5/1989 | Everett | H01F 7/1646 335/229 |
| 5,427,352 | A * | 6/1995 | Brehm | F15B 13/0405 188/268 |
| 5,474,107 | A * | 12/1995 | Hayes | F16K 31/0627 137/625.5 |
| 5,669,406 | A * | 9/1997 | Gluf, Jr. | F16K 31/0637 137/270 |
| 6,336,621 | B1 * | 1/2002 | Ii | F02M 51/0667 251/129.15 |
| 6,367,766 | B1 * | 4/2002 | Briant | F16K 31/0655 251/129.02 |
| 7,159,843 | B1 * | 1/2007 | Mullally | F16K 31/0651 251/129.16 |
| 7,273,186 | B2 | 9/2007 | Kubo et al. | |
| 8,167,000 | B2 * | 5/2012 | Neff | F16K 27/0263 137/625.67 |
| 8,814,135 | B2 * | 8/2014 | Ams | F16K 31/0686 188/322.5 |
| 9,074,699 | B2 * | 7/2015 | Jamison | F16K 1/34 |
| 2013/0112904 | A1 * | 5/2013 | Tanari | F16K 31/0655 251/129.15 |

FOREIGN PATENT DOCUMENTS

| | | |
|---|---|---|
| DE | 102 15 592 | 5/2003 |
| DE | 10 2006 012 530 | 9/2007 |
| DE | 10 2008 017 764 | 10/2009 |
| DE | 10 2008 023 182 | 11/2009 |
| DE | 10 2008 063 339 | 2/2010 |
| DE | 10 2013 009 838 | 7/2014 |

* cited by examiner

SOLENOID VALVE FOR A FUEL SYSTEM

BACKGROUND OF THE INVENTION

The invention relates to a solenoid valve for a fuel system comprising a housing in which an electric coil and an armature are arranged. The armature and an armature plate together form parts of a magnetic circuit wherein the armature plate supports a valve member which forms, together with an outlet provided at a valve seat, the switchable valve. When current is flowing through the coil, a magnetic field is generated in the armature and the armature plate is attracted by the armature into an operative valve position. A valve spring is provided which returns the armature plate into a rest position when the coil is currentless (no current is flowing through the coil). The valve seat, the valve member, the valve spring, and the armature plate are secured in the housing.

Such a solenoid valve comprises a housing in which an electric coil and an armature are arranged, wherein the armature and an armature plate form parts of a magnetic circuit. The armature plate supports a valve member which controls a valve seat with an outlet. When current is flowing through the coil, a magnetic field is produced and the armature plate is attracted by the armature into a first valve position, which is the operative valve position. When the coil is currentless, the armature plate is returned by means of a valve spring into a second valve position, which is the rest position. The valve seat, the valve member, the valve spring, and the armature plate are secured in the housing.

Assembly of the solenoid valve from its individual parts is complex and in particular the positional adjustment of the valve seat, the valve member, the valve spring, and the armature plate is complex.

The invention has the object to further develop a solenoid valve of the aforementioned kind in such a way that a positionally correct assembly of valve seat, valve member, valve spring, and armature plate is facilitated.

SUMMARY OF THE INVENTION

In accordance with the present invention, this is achieved in that the valve seat, the valve member, the valve spring, and the armature plate are connected to each other captively and form a valve unit. In the preassembled valve unit the valve seat is loosely positioned between the valve member and the armature plate. When the valve unit is inserted into an open end of the housing, the valve spring contacts an inner shoulder of the housing. In this way, the mounting position of the valve unit in the housing of the solenoid valve is constructively predetermined so that assembly is simplified.

Preferably, the valve seat is formed on a valve base body wherein the valve base body is secured with clearance between armature plate and valve member. The valve base body forms a base body of the valve unit.

The valve spring and the armature plate are arranged at a first end face of the valve base body while the valve member is positioned on the opposite second end face of the valve base body. The valve base body is movably supported between the valve spring or the armature plate and the valve member and is preferably captively secured.

The valve base body comprises an outlet which is controlled by the valve member. The outlet is penetrated by a valve plunger. The valve plunger supports the armature plate, the valve spring, and the valve member. In this context, the armature plate and the valve spring are secured at the first end of the valve plunger and the valve member is attached to the second end of the valve plunger.

In the preassembled valve unit the valve spring, the armature plate, the valve plunger, the valve member, and the valve base body are connected to each other captively. Preferably, the valve base body can move radially as well as axially relative to the valve plunger. The radial position of the valve base body relative to the valve plunger is aligned once the valve unit is installed in the open end of the housing of the solenoid valve. This can be realized by means of the valve spring which, upon installation in the open end of the housing, is aligned radially in the housing and thereby aligns the valve member relative to the valve seat provided on the valve base body. The exterior diameter of the valve spring corresponds in this context to the inner diameter of the open end of the housing of the solenoid valve.

The valve unit is pushed axially into the open end of the housing wherein the insertion depth of the valve unit in the open end of the housing is constructively delimited by an inner shoulder. The outer rim of the valve spring contacts the inner shoulder and is secured, preferably by clamping action, at the inner shoulder by the pressed-in valve base body.

Preferably, the valve spring is held in the open end of the housing so as to be secured against rotation.

In particular, the valve spring is fastened so as to be secured against rotation on the valve base body, preferably is connected thereto by laser welding.

In a further embodiment of the invention, the valve stroke of the valve is adjusted upon assembly of the valve unit so that no further adjusting work is required after insertion of the valve unit into the open end of the housing of the solenoid valve.

The valve spring in the pre-mounted valve unit, prior to insertion into the open end of the housing, is free of any spring forces.

Expediently, the valve base body is designed to have excess size or oversize and is pressed into the open end of the housing. Preferably, the housing is comprised of plastic material.

In a further embodiment of the invention, for fixation of the valve unit in the open end of the housing, which is preferably comprised of plastic material, it can also be provided to crimp or caulk the valve unit in the housing, in particular with thermal action.

The solenoid valve according to the invention is a valve which is open in the currentless state, i.e., when no current is flowing in the drive coil, the valve is open. In the currentless open position of the valve, the valve spring is free of any restoring forces.

Further features of the invention result from the claims, the description, and the drawing in which an embodiment of the invention which will be explained in the following in more detail is illustrated.

DESCRIPTION OF PREFERRED EMBODIMENTS

Figure 1:
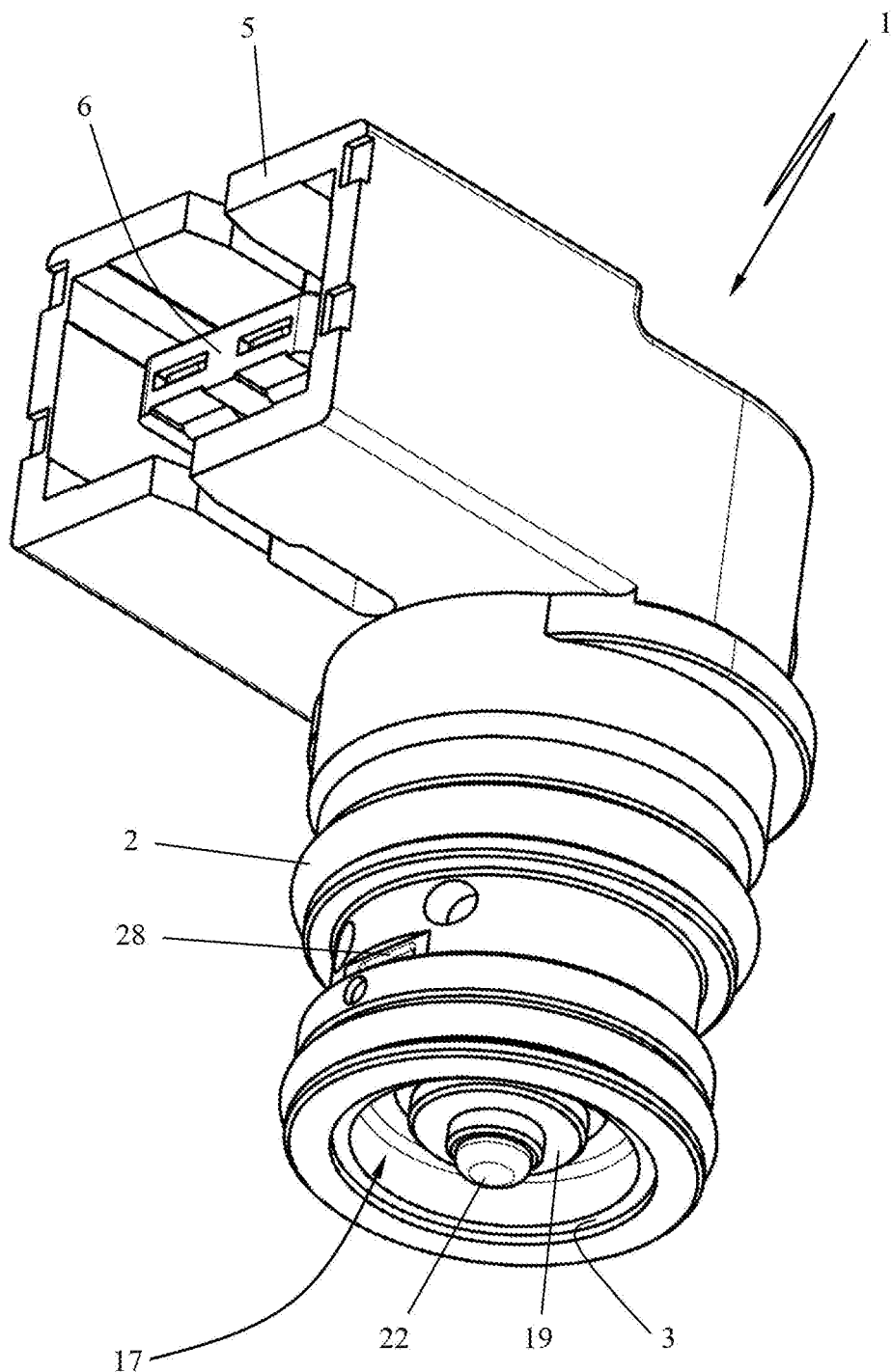
FIG. 1 shows in a perspective view a solenoid valve for a fuel system.

The illustrated embodiment of the solenoid valve 1 shown in the drawings is provided as a flow control valve for a fuel system in which preferably a pressure in the range of mbar is present. In particular, the valve 1 is used for metering a fuel quantity in particular in a millibar range for which purpose the drive coil of the valve 1 is supplied with a current modulated in the pulse width. In operation of the valve 1, the current is modulated in the pulse width wherein the valve 1 opens and closes in accordance with the applied current pulses or the intervals between the applied current pulses. The flow rate of the valve 1 is proportional to the pulse width of the current so that by means of the pulse width the flow rate can be adjusted.

Figure 2:
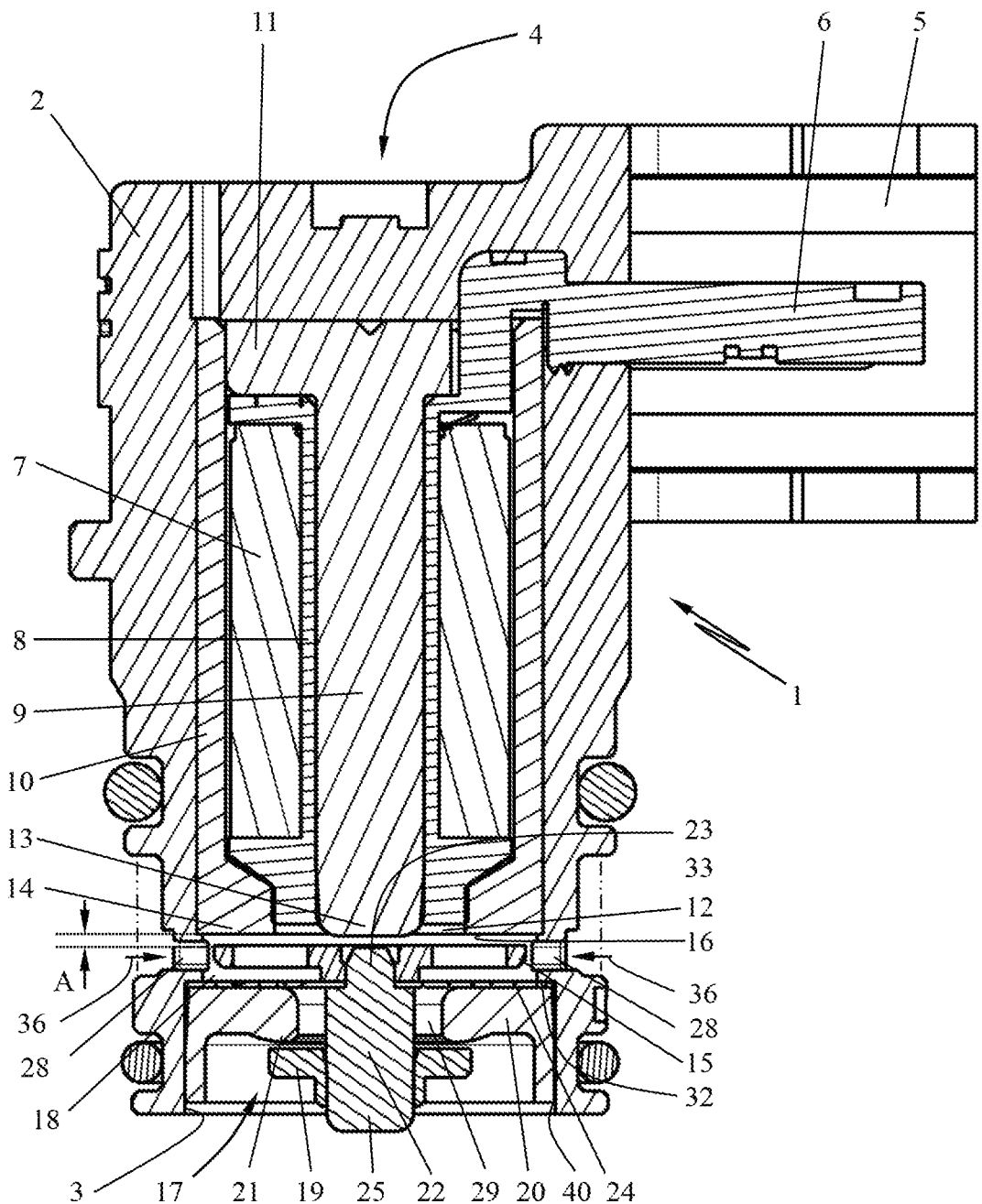
FIG. 2 shows in axial section the solenoid valve according to FIG. 1.

As shown in FIG. 2, the solenoid valve 1 is comprised of a substantially cylindrical housing 2 with an open end 3.

At the end 4 opposite the open end 3, an electrical connector socket 5 is provided into which a valve plug, not illustrated in detail, for electrical connection of the solenoid valve 1 to a control unit is to be plugged. The electrical plug contacts 6 of the connector socket 5 provide the electrical connection to the coil 7 of the solenoid valve 1.

The coil 7 of the solenoid drive of the valve 1 is supported on a coil support 8 which is inserted into the housing 2.

A central magnetic core 9 penetrates the coil support 8 and, together with the magnetic cylindrical outer jacket 10, forms a magnetic circuit.

The outer jacket 10 is positioned within the housing 2 and surrounds the electrical coil 7 of the solenoid drive of the valve 1.

At the closed end 4 of the housing 2, the magnetic core 9 is in magnetic contact with the outer jacket 10 by means of a closure plate 11 that is preferably formed as a monolithic element of the magnetic core 9, i.e., a one-piece structure is provided, as shown in FIG. 2. At the free end 13 of the magnetic core 9 which is neighboring the open end 3 of the housing 2, an annular gap 12 is formed between the free end 13 of the magnetic core 9 and the end 14 of the outer jacket 10. Opposite the free end 13 of the magnetic core 9 an armature plate 15 is positioned which is attracted against the end face 16 of the drive by the magnetic field lines generated when current is flowing through the coil 7. The armature plate 15 forms the movable part of the solenoid drive of the valve 1.

It may be advantageous to first assemble the coil support 8, the electrical coil 7, and the magnetic circuit, comprised of magnetic core 9 with closure plate 11 and outer jacket 10, and to embed, by injection molding, the pre-assembled unit in plastic material for formation of the housing 2.

Figure 4:
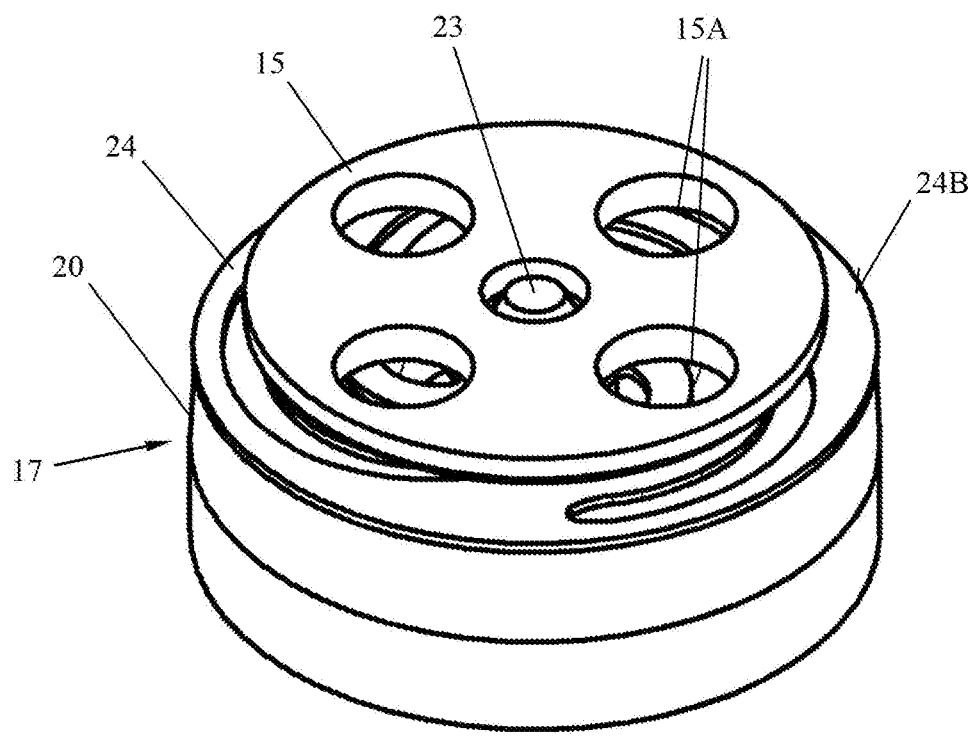
FIG. 4 is a perspective illustration of a valve unit comprised of a valve seat, a valve member, a valve spring, and an armature plate.

The armature plate 15 is part of a valve unit 17 which is inserted into the open end 3 of the housing 2 preferably comprised of plastic material. The preassembled valve unit 17 is illustrated in particular in FIGS. 4 and 5. The valve unit 17 is comprised of a valve base body 20 in which centrally a valve seat 21 is formed. The valve seat 21 is penetrated by a valve plunger 22. The valve plunger 22 has a first end 23 facing the magnetic core 9; the first end 23 supports a valve spring 24 and the armature plate 15. The valve member 19 is secured at the second end 25 of the valve plunger 22 which is facing away from the magnetic core 9. The valve member 19 can be comprised of elastic material in order to ensure sealing action at the valve seat 21 of the valve base body 20.

It may be sufficient to provide the valve member 19 with an elastic sealing surface on its flat side 39 which is facing the valve seat 21. The valve member 19 can be comprised of metal so that a safe attachment on the valve plunger 22, which is also made of metal, is ensured.

In the illustrated embodiment, the valve member 19 and the valve seat 21 at the valve body 20 are comprised of metal. The valve 1 closes with metallic contact of the valve member 19 on the valve seat 21. This provides for a robust wear-resistant valve 1.

In the mounted position of the valve unit 17 illustrated in FIG. 2, a valve chamber 18 is formed between the valve base body 20 and the solenoid drive. Via openings 28 which are preferably designed as rectangular cutouts (FIG. 1) in the cylindrical housing 2 of the valve 1, liquid is supplied to the valve chamber 18; in the embodiment this liquid is fuel. In the embodiment, the fuel is supplied in the direction of arrow 36 from an annular space 33 which is formed when the valve 1 is in the mounted position. A precise metering of a fuel quantity is ensured by means of the controllable (switchable) outlet 29 of the valve seat 21.

The armature plate 15 and the valve spring 24 are positioned in the valve chamber 18 and the liquid, in the illustrated embodiment the fuel, flows about them. In the armature plate 15 several penetrations 15A are formed through which the liquid can flow when the armature plate 15 moves. The valve spring 24, due to its configuration (see FIGS. 3 and 4), also has penetrations which enable passage of fuel when a valve stroke is carried out.

The valve 1 of the embodiment is a valve that is open when no current is supplied. This means that for a currentless coil 7 the armature plate 15 is in its rest position which is referred to as first valve position. When current is flowing through the coil 7, the armature plate 15 is magnetically attracted so that the valve member 19 closes the outlet 29. The armature plate 15, in its position almost touching the end face 16, is positioned in a second valve position, i.e., an operative valve position.

Figure 5:
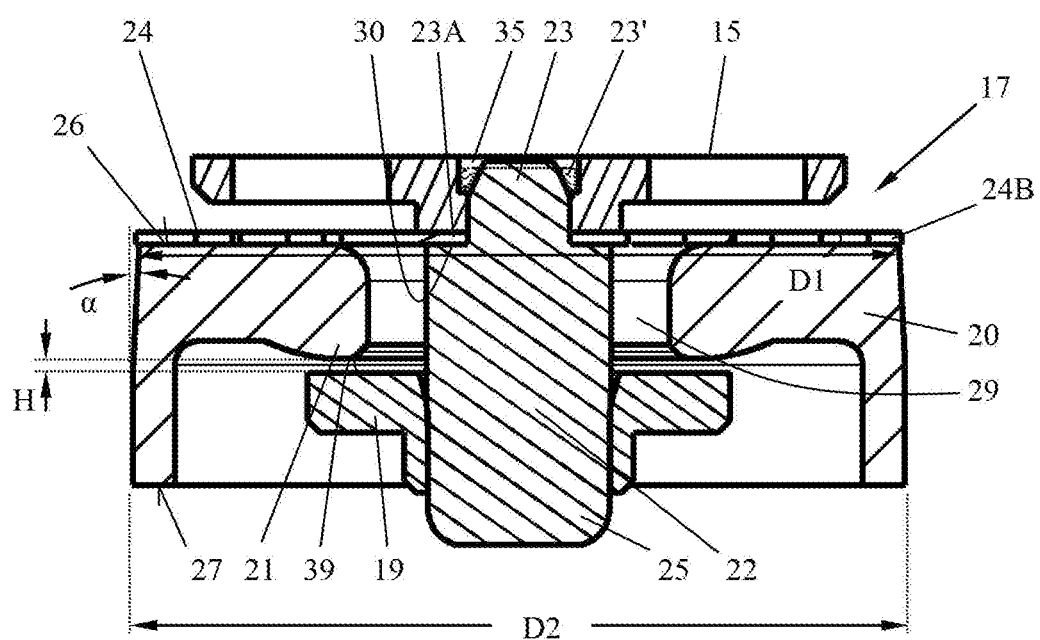
FIG. 5 shows a section view of the valve unit according to FIG. 4.

When the current is switched off, the armature plate 15 drops and the valve plunger 22 is returned by the force of the valve spring 24 into the rest position illustrated in FIGS. 2 and 5. In this rest position, which corresponds to the first-open-valve position, the valve spring 24 is free of force action. The valve spring 24 has no restoring forces.

In the illustrated embodiment, the valve unit 17 forms a pre-assembled independent component group. It is comprised of the valve base body 20 which is formed at its end face 26, which is facing the armature plate 15, with a first diameter D1 and at the second end face 27, which is facing away from the armature plate 15, with a second diameter D2. The first diameter D1 is smaller than the second diameter D2. The valve base body 20 is of a slightly conically tapering configuration with regard to its outer diameter. As shown in FIG. 5, the cone angle α is 0.5° to 2°.

Figure 3:
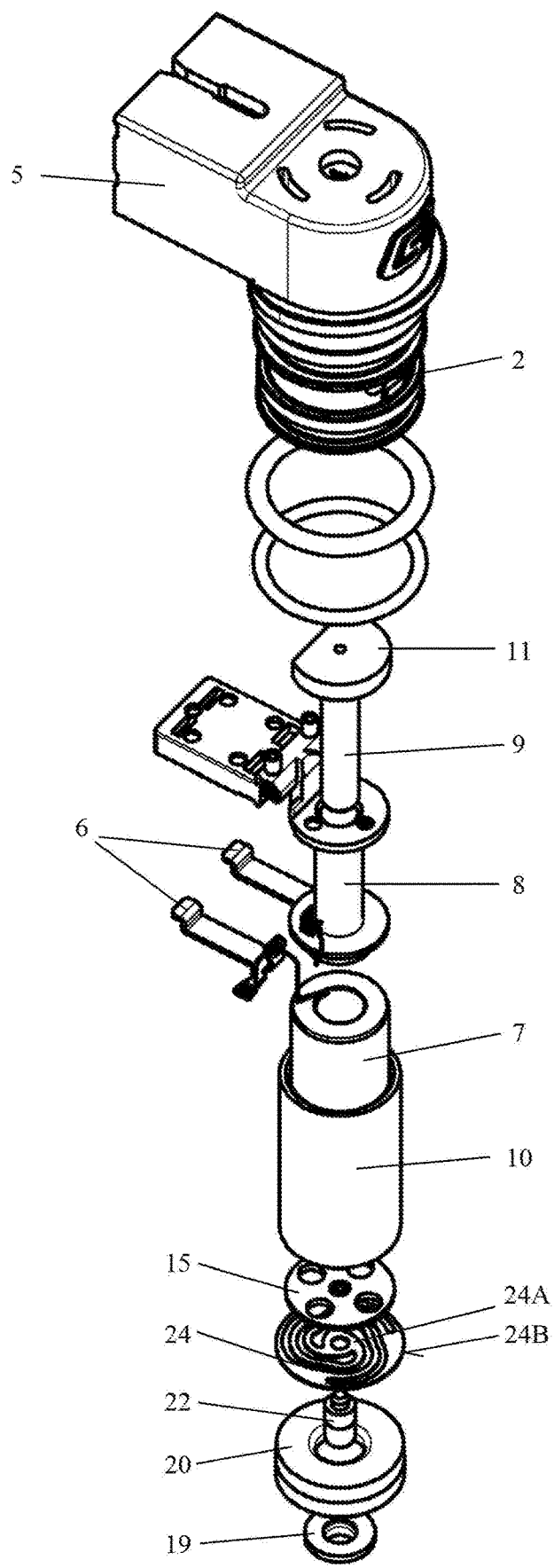
FIG. 3 is an exploded view of the solenoid valve.

At the smaller end face 26 of the valve base body 20, the valve spring 24 is positioned which is designed like a flat spiral spring (compare FIG. 3). The center 24A of the valve spring 24 is penetrated by the tapering end 23 of the valve plunger 22 wherein the center of the valve spring 24 is resting on a shoulder 30 of the valve plunger 22. Also, the armature plate 15 is press-fit onto the free end 23 of the valve plunger 22 so that the valve spring 24 is fixedly connected with the valve plunger 22. The armature plate 15 secures the valve spring 24 on the shoulder 30 of the valve plunger 22. The valve plunger 22 is comprised of metal as is the armature plate 15. The end 23 of the valve plunger 22 is plastically deformed for fixation of the armature plate 15 on the end 23. As is illustrated greatly simplified in FIG. 5 in dashed lines, the deformed head 23' of the end 23 is positioned in a recess 35 of the armature plate 15 so that a form-fit connection is produced.

The valve plunger 22 is now guided through the outlet 29 at the center of the valve base body 20 and the valve member 19 is pushed onto its free end 25 and is preferably attached captively. In particular, the valve member 19 is press-fit onto the valve plunger 22. The term captive is to be understood such that, after assembly of the individual components of the valve unit 17, all components are connected to each other, preferably movably connected to each other, so that all components can be transported and mounted only together as a unit. The valve unit 17 forms an independent component group which, after detachment of the individual components, can be disassembled into its individual components.

Mounting of the valve member 19 on the valve plunger 22 is carried out such that during preassembly of the valve unit 17 already the stroke H of the valve 1 is adjusted. The stroke H is expediently smaller than the distance A at which the armature plate 15 is spaced relative to the end face 16 of the solenoid drive in its rest position, i.e., in the first valve position.

Once the valve member 19 has been pressed onto the valve plunger 22, whereby the stroke H relative to the valve seat 21 is also produced, the valve base body 20 is captively connected with the other components of the valve unit 17, i.e., with the armature plate 15, the valve spring 24, the valve plunger 22, and the valve member 19.

In a further embodiment of the invention, the valve spring 24 can be secured against rotation. Expediently, the valve spring 24 is secured on the valve base body 20 of the valve unit 17. The valve base body 20 is comprised preferably of metal. The outer rim 24B of the valve spring 24 can be secured on the valve base body 20 against rotation. In particular, the valve spring 24 can be welded or laser-welded to the valve base body 20.

When the valve unit 17 is completely mounted, the valve member 19 is positioned with the preadjusted stroke H relative to the valve seat 21; the valve spring 24 is free of any spring forces in this position.

For mounting the valve unit 17, the valve unit 17 is pushed into the open end 3 of the housing 2. In doing so, the outer rim 24B of the valve spring 24 will contact an inner shoulder 32 of the housing 2. When the valve spring 24 is not connected with the valve base body 20, which is the preferred embodiment as has been explained above, a radial alignment of the valve spring 24 upon insertion of the valve unit 17 into the housing 2 occurs. Upon pressing in the valve base body 20 into the open end 3, the outer rim 24B of the valve spring 24 is clamped against the inner shoulder 32 of the housing 2. By pressing in the valve base body 20 into the open end 3, the valve spring 24, on the one hand, is rotationally fixed on the inner shoulder 32 and, on the other hand, is radially aligned so that the valve member 19 is aligned with proper position relative to the valve seat 21.

Expediently, the valve base body 20 of the valve seat 21, relative to the diameter of the open end 3 of the housing 2, is oversized so that by pressing in the valve unit 17 into the open end 3 a permanent and secure fixation of the valve base body 20 in the open end 3 is achieved.

In a further embodiment, the valve unit 17 can be securely fixed in the open end 3 of the housing 2 by thermal crimping or caulking. In this context, the plastic material of the housing is surficially melted and displaced so that the surficially melted plastic material covers the circumferential rim 40 of the valve base body 20; after the plastic material has cooled down and solidified, the valve unit 17 is secured with form fit in the open end 3.

The specification incorporates by reference the entire disclosure of German priority document 10 2015 007 694.9 having a filing date of Jun. 17, 2015.

While specific embodiments of the invention have been shown and described in detail to illustrate the inventive principles, it will be understood that the invention may be embodied otherwise without departing from such principles.

What is claimed is:

1. A solenoid valve for a fuel system, the solenoid valve comprising:
   a housing comprising an inner shoulder;
   an electric coil disposed in the housing;
   a magnetic core disposed in the housing;
   a valve base body comprising a valve seat;
   a valve member;
   a valve spring;
   an armature plate;
   wherein the valve member, the valve spring, the armature plate, and the valve base body comprising the valve seat are all connected captively to each other outside of the housing to form an integral preassembled valve unit;
   wherein in the integral preassembled valve unit, outside of the housing, the valve base body comprising the valve seat is loosely and captively secured with clearance between the valve member and the armature plate;
   wherein the solenoid valve is configured such that the integral preassembled valve unit is insertable in an insertion direction from outside of the housing into an open end of the housing without disassembling the integral preassembled valve unit;
   wherein the integral preassembled valve unit is secured in the housing and is supported, in the insertion direction, only at the inner shoulder of the housing;
   wherein the valve spring, when the integral preassembled valve unit is secured inside the housing, contacts the inner shoulder of the housing;
   wherein the armature plate forms, together with the magnetic core, a magnetic circuit;
   wherein the valve member is supported on the armature plate;
   wherein the valve seat comprises an outlet and the valve member is configured to be switched to open and close the outlet;
   wherein, when the electric coil is supplied with current, a magnetic field is generated in the magnetic core and the armature plate is attracted by the magnetic core into an operative valve position;
   wherein the valve spring is configured to return the armature plate from the operative valve position into a rest position when the coil is currentless.

2. The solenoid valve according to claim 1, wherein the valve base body comprises a first end face and a second end face opposite the first end face, wherein the valve spring and the armature plate are arranged at the first end face of the valve base body and the valve member is arranged at the second end face of the valve base body.

3. The solenoid valve according to claim 1, wherein the integral preassembled valve unit further comprises a valve plunger penetrating the outlet, wherein the valve plunger supports the armature plate, the valve spring, and the valve member.

4. The solenoid valve according to claim 1, wherein, when the integral preassembled valve unit is inserted into the open end of the housing, the valve spring is radially aligned in the housing and the valve member is aligned relative to the valve seat.

5. The solenoid valve according to claim 1, wherein the valve spring is rotationally secured on the valve base body.

6. The solenoid valve according to claim 5, wherein the valve spring is laser-welded to the valve base body.

7. The solenoid valve according to claim 1, wherein the valve base body is oversized and is press-fit into the open end of the housing.

8. The solenoid valve according to claim 1, wherein the valve base body is secured by thermal crimping in the open end of the housing.

9. The solenoid valve according to claim 1, wherein an insertion depth of the integral preassembled valve unit into the open end of the housing is delimited by the inner shoulder.

10. The solenoid valve according to claim 1, wherein the valve spring is secured against rotation.

11. The solenoid valve according to claim 1, wherein a valve stroke of the valve is preadjusted during assembly of the integral preassembled valve unit.

12. The solenoid valve according to claim 1, wherein in the integral preassembled valve unit the valve spring is free of spring forces.

13. A solenoid valve for a fuel system, the solenoid valve comprising:
   a housing comprising an inner shoulder;
   an electric coil disposed in the housing;
   a magnetic core disposed in the housing;
   a valve base body comprising a valve seat;
   a valve member;
   a valve spring;
   an armature plate;
   wherein the valve member, the valve spring, the armature plate, and the valve base body comprising the valve seat are all connected captively to each other outside of the housing to form an integral preassembled valve unit;
   wherein in the integral preassembled valve unit, outside of the housing, the valve base body comprising the valve seat is loosely and captively secured with clearance between the valve member and the armature plate;
   wherein the solenoid valve is configured such that the integral preassembled valve unit is insertable from outside of the housing into an open end of the housing without disassembling the integral preassembled valve unit;
   wherein the integral preassembled valve unit is secured in the housing and wherein the valve spring, when the integral preassembled valve unit is secured in the housing, contacts the inner shoulder of the housing;
   wherein the armature plate forms, together with the magnetic core, a magnetic circuit;
   wherein the valve member is supported on the armature plate;
   wherein the valve seat comprises an outlet and the valve member is configured to be switched to open and close the outlet;
   wherein, when the electric coil is supplied with current, a magnetic field is generated in the magnetic core and the armature plate is attracted by the magnetic core into an operative valve position;
   wherein the valve spring is configured to return the armature plate from the operative valve position into a rest position when the coil is currentless;
   wherein the solenoid valve is configured to be in an open state when no current is supplied.

14. The solenoid valve according to claim 13, wherein the valve spring is free of restoring forces in the open state.

15. The solenoid valve according to claim 1, wherein the armature plate comprises a first diameter and the valve base body comprises a second diameter, wherein the first diameter is smaller than the second diameter.

16. A solenoid valve for a fuel system, the solenoid valve comprising:
   a housing comprising an inner shoulder;
   an electric coil disposed in the housing;
   a magnetic core disposed in the housing;
   a valve base body comprising a valve seat;
   a valve member;
   a valve spring;
   an armature plate;
   wherein the valve member, the valve spring, the armature plate, and the valve base body comprising the valve seat are all connected captively to each other outside of the housing to form an integral preassembled valve unit;
   wherein in the integral preassembled valve unit, outside of the housing, the valve base body comprising the valve seat is loosely and captively secured with clearance between the valve member and the armature plate;
   wherein the integral preassembled valve unit is secured in the housing and wherein the valve spring, when the integral preassembled valve unit is secured inside the housing, contacts the inner shoulder of the housing;
   wherein the solenoid valve is configured such that the integral preassembled valve unit is mountable by inserting the integral preassembled valve unit from outside of the housing into an open end of the housing without disassembling the integral preassembled valve unit;
   wherein the integral preassembled valve unit is reproducibly insertable into the open end of the housing such that the valve spring is free of any spring forces when the integral preassembled valve unit is completely mounted;
   wherein the armature plate forms, together with the magnetic core, a magnetic circuit;
   wherein the valve member is supported on the armature plate;
   wherein the valve seat comprises an outlet and the valve member is configured to be switched to open and close the outlet;
   wherein, when the electric coil is supplied with current, a magnetic field is generated in the magnetic core and the armature plate is attracted by the magnetic core into an operative valve position;
   wherein the valve spring is configured to return the armature plate from the operative valve position into a rest position when the coil is currentless.

* * * * *